(12) United States Patent
Haydn et al.

(10) Patent No.: US 8,589,023 B2
(45) Date of Patent: Nov. 19, 2013

(54) METHOD FOR CHECKING THE SUITABILITY OF A MOBILE TELEPHONE

(75) Inventors: Andreas Haydn, Passau (DE); Michael Tusche, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 929 days.

(21) Appl. No.: 12/718,345

(22) Filed: Mar. 5, 2010

(65) Prior Publication Data

US 2010/0222962 A1    Sep. 2, 2010

Related U.S. Application Data

(63) Continuation of application No. PCT/EP2008/006874, filed on Aug. 21, 2008.

(30) Foreign Application Priority Data

Sep. 7, 2007  (DE) .......................... 10 2007 042 795

(51) Int. Cl.
   *G06F 9/00* (2006.01)

(52) U.S. Cl.
   USPC .......................................... 701/36; 455/11.1

(58) Field of Classification Search
   USPC .......... 701/36; 455/11.1, 456.1–456.3, 556.1, 455/556.2, 557, 569.2
   See application file for complete search history.

(56) References Cited

U.S. PATENT DOCUMENTS

| 5,659,594 A | 8/1997 | Toda |
| 6,226,497 B1 | 5/2001 | Guentzer et al. |
| 7,349,722 B2 * | 3/2008 | Witkowski et al. ........ 455/569.2 |
| 7,894,861 B2 * | 2/2011 | Grivas et al. ............... 455/569.2 |
| 2004/0097272 A1 | 5/2004 | Schuffert |
| 2007/0185630 A1 | 8/2007 | Sykora et al. |
| 2011/0105198 A1 * | 5/2011 | Grivas et al. ............... 455/569.2 |

FOREIGN PATENT DOCUMENTS

| DE | 10 2006 005 942 A1 | 8/2007 |
| JP | 2006-270679 A | 10/2006 |
| WO | WO 98/59425 A1 | 12/1998 |
| WO | WO 02/060078 A2 | 8/2002 |

OTHER PUBLICATIONS

German Search Report dated Feb. 7, 2008 including partial English translation (Nine (9) pages).
International Search Report dated Jan. 14, 2009 including English translation (Four (4) pages).

* cited by examiner

*Primary Examiner* — Dalena Tran
(74) *Attorney, Agent, or Firm* — Crowell & Moring LLP

(57) ABSTRACT

In a method for checking the suitability of a mobile telephone for connection to at least one motor vehicle device of a motor vehicle, characteristic vehicle data describing the motor vehicle device are determined in the motor vehicle, characteristic telephone data describing the mobile telephone are acquired by the motor vehicle device, and an evaluation device for evaluating the suitability of a mobile telephone described by characteristic telephone data for connection to a motor vehicle device described by characteristic vehicle data are made available in a stationary service center. The characteristic vehicle data and the characteristic telephone data are transmitted to the service center via a communication link between the motor vehicle and the service center that is established independently of the mobile telephone, in order to evaluate the suitability of the mobile telephone for connection to the motor vehicle device.

12 Claims, 1 Drawing Sheet

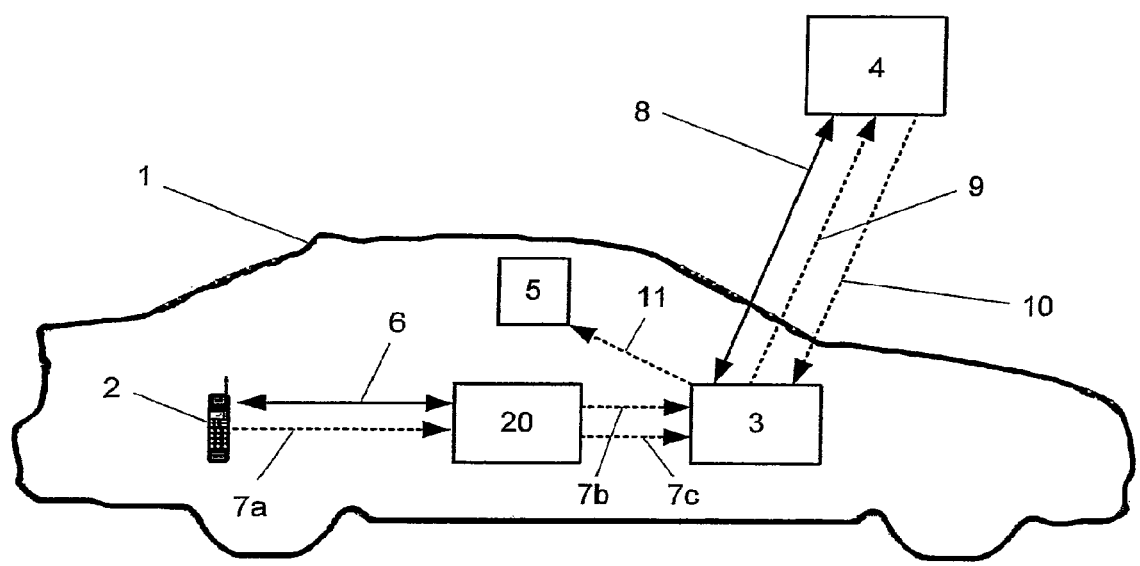

METHOD FOR CHECKING THE SUITABILITY OF A MOBILE TELEPHONE

CROSS-REFERENCE TO RELATED APPLICATIONS

This application is a continuation of PCT International Application No. PCT/EP2008/006874, filed Aug. 21, 2008, which claims priority under 35 U.S.C. §119 from German Patent Application No. DE 10 2007 042 795.8, filed Sep. 7, 2007, the entire disclosures of which are herein expressly incorporated by reference.

BACKGROUND AND SUMMARY OF THE INVENTION

The invention relates to a method for checking the suitability of a mobile telephone for connection to at least one motor vehicle device of a motor vehicle.

Present-day motor vehicles provide numerous functions based on the connection of the mobile telephone to at least one motor vehicle device of the motor vehicle. The motor vehicle device can be a hands-free set, which is installed permanently in the motor vehicle and which makes it more convenient for the vehicle user to talk over the phone in the motor vehicle. Alternately or additionally, the motor vehicle device can also be formed as a telematics unit which exchanges data with service providers and/or with other motor vehicles by way of the mobile telephone functioning as a modem.

In order to ensure error-free functioning and the full function range desired, the mobile telephone used must be suitable for connection to the motor vehicle device. Manufacturers of motor vehicles typically publish compatibility lists, with the aid of which a customer can check the type and firmware or software version required by a mobile telephone in order to be compatible with a defined motor vehicle. In addition to the vehicle type, a distinction must also be made according to the equipment variants of the motor vehicle and/or firmware or software versions of components of the motor vehicle. Accordingly, the process of determining the compatibility can turn out to be very cumbersome and complicated. Many vehicle users therefore shy away from the option of compatibility verification based on compatibility lists (or at least do not perform said verification by choice). As a result, the provision of compatibility lists prompts only a limited number of all related vehicle users to use a mobile telephone that is suitable for connection to their vehicles.

The use of a mobile telephone which is not suitable or is suitable only to a limited extent for connection to a motor vehicle or the motor vehicle device relevant to the respective case can result in malfunctions and/or a limited range of functions.

It is an object of the invention to provide an improved method for checking the suitability of a mobile telephone for connection to at least one motor vehicle device of a motor vehicle.

This object is achieved by a method for checking the suitability of a mobile telephone for connection to at least one motor vehicle device of a motor vehicle. The method is characterized in that characteristic vehicle data describing the motor vehicle device are determined in the motor vehicle, characteristic telephone data describing the mobile telephone are acquired by way of the motor vehicle device, and the suitability of a mobile telephone described by characteristic telephone data for connection to a motor vehicle device described by characteristic vehicle data are evaluated and made available in a stationary service center. The characteristic vehicle data and the characteristic telephone data are transmitted to the service center via a communication link between the motor vehicle and the service center that is established independently of the mobile phone, to evaluate the suitability of the mobile telephone for connection to the motor vehicle device.

The invention releases the vehicle user from the often complicated, cumbersome and/or error-prone process of determining the suitability of his mobile telephone for connection to the corresponding device of his motor vehicle such as a permanently installed hands-free set.

The suitability is evaluated according to the invention in a stationary service center. An employee of the service center can initiate and/or carry out the communication of the result of the evaluation to the vehicle user or the communication can be sent automatically from an automated service center, which can be formed as a computer unit or network of computer units, in response to a corresponding request.

According to the invention, characteristic vehicle data describing the motor vehicle device are determined in the motor vehicle. In the simplest case, these characteristic vehicle data directly relate to the motor vehicle device itself, for example, the type of hands-free set and its firmware/software version, if appropriate.

The characteristic vehicle data can also only indirectly relate to the motor vehicle device. For example, the characteristic vehicle data can relate to the vehicle type (e.g., "BMW 335d") and/or equipment variants of the motor vehicle (e.g., "special equipment: hands-free set with Bluetooth interface") and/or firmware or software versions of other components of the motor vehicle (e.g., date of the software version of essential control devices of the motor vehicle). Such data are usually sufficient for subsequently carrying out compatibility verification in the service center in that the accurate characteristics of the motor vehicle device are derived from individual or all the aforementioned data relating indirectly to the motor vehicle device.

The defined characteristic vehicle data can also be limited to a designation of the individual motor vehicle (e.g., chassis number or license plate number). As long as the service center is provided with a mechanism (e.g., in the form of a customer database) which enable conclusions to be drawn from such characteristic vehicle data on the vehicle type and/or equipment variants of the motor vehicle and/or firmware or software versions of components of the motor vehicle, such data are also sufficient in order to subsequently carry out a compatibility verification in the service center. This holds true particularly when the accurate characteristics of the motor vehicle device can be derived from the designation of the individual motor vehicle.

Furthermore, according to the invention, characteristic telephone data describing the mobile telephone are acquired by the motor vehicle device. In particular, the model of the mobile telephone and data on the firmware or software version is relevant as characteristic telephone data.

In order to enable an evaluation of the compatibility between the mobile telephone and the motor vehicle device, an evaluation device for evaluating the suitability of a mobile telephone described by characteristic telephone data for connection to a motor vehicle device described by characteristic vehicle data is made available in a stationary service center.

An evaluation device can be formed as a computer unit which is suitable, following manual or automatic entry of characteristic telephone data and characteristic vehicle data, for providing a result relating to the suitability of the mobile telephone described by characteristic telephone data for connection to the motor vehicle device described by characteristic vehicle data. For this purpose, the computer unit can access an allocation table stored in a memory unit and organized as a look-up table, the content of which substantially corresponds to a compatibility list. Furthermore, the computer unit is preferably suitable for optionally drawing the aforementioned conclusions in advance from characteristic vehicle data relating possibly only indirectly to the motor vehicle device on the accurate characteristics of the motor vehicle device.

In place of the evaluation device formed as a computer unit, the service center can also be provided with other evaluation mechanisms such as written compatibility lists, by which an employee of the service center can carry out a compatibility verification based on defined characteristic telephone data and characteristic vehicle data.

Lastly, the aforementioned characteristic vehicle data and the aforementioned characteristic telephone data are transmitted to the aforementioned service center via a communication link between the motor vehicle and the service center in order to evaluate the suitability of the mobile telephone for connection to the motor vehicle device with the aid of the evaluation device provided in the service center.

If an evaluation device formed as a computer unit is provided, the transmitted characteristic vehicle data and the characteristic telephone data are preferably automatically input into the computer unit after their transmission, and an evaluation process is started automatically.

If an employee of the service center carries out the evaluation, the characteristic vehicle data and the characteristic telephone data cited above are preferably displayed visually in the service center so that the employee can read the same.

According to the invention, an already existing or easily installable communication link between the motor vehicle and the service center, established independently of the mobile phone, serves as the communication link for transmitting the characteristic vehicle data and characteristic telephone data. It is particularly advantageous to use a link between the motor vehicle and the service center, which link is provided or can be provided independently of the invention.

For example, a link of the motor vehicle to an Internet portal that is provided anyway or can be provided independently of the invention (e.g., a link via a separate telematics unit of the motor vehicle to the Internet portal "BMW Online") can be used for this purpose. Then, it is not necessary to provide a communication link especially for the purposes of the invention.

According to a first variant of the first embodiment of the invention, the server of the Internet portal, to which the motor vehicle is connected or connectable for using the Internet portal, is then connected or connectable to the service center within the meaning of the present invention. This is easily possible by way of a standard Internet connection, for example.

Alternately, according to a second variant of the first embodiment of the invention, the server of the Internet portal, to which the motor vehicle is connected or connectable for using the Internet portal, can simultaneously function as a service center within the meaning of the present invention. The implementation of the invention then requires very low communication expenditure.

If the motor vehicle device, to which the mobile telephone is connected, is not involved directly in the communication link used for transmitting the characteristic vehicle data and characteristic telephone data, the characteristic telephone data are initially transmitted within the vehicle by a motor vehicle device to the communication partner of the vehicle (e.g., separate telematics unit) of this communication link. If the required characteristic vehicle data are not present with this communication partner of the vehicle, the characteristic vehicle data can also be initially transferred within the vehicle by the motor vehicle device to the communication partner of the vehicle.

The method of the invention for checking the suitability of the mobile telephone is preferably carried out after each initial connection of a mobile telephone to the motor vehicle device. It can also be carried out after each reconnection. Alternately or additionally, it can be repeated cyclically, at predetermined points in time, or at the request of the vehicle user.

In principle, the characteristic vehicle data and the characteristic telephone data can be transmitted separately from each other both in terms of organization and time. For example, the characteristic vehicle data can be present anyway with a service center used for purposes other than those of the invention (e.g., Internet portal) or they can remain stored following a previous transmission, and the characteristic telephone data are transmitted separately later. Particularly, if the service center is used for purposes of the vehicle exclusively within the meaning of the invention, it is advantageous to transmit characteristic vehicle data and characteristic telephone data promptly and adjacently or even in a single message to the service center.

According to a second preferred embodiment of the present invention, the communication link for transmitting the characteristic vehicle data and the characteristic telephone data is established by way of the mobile telephone itself. For example, the motor vehicle can be set up in such a way, and the connection of the mobile telephone to the motor vehicle or the motor vehicle device can be formed in such a way, that the mobile telephone serves as a modem for a communications and/or information service of the motor vehicle, in which the motor vehicle communicates via this modem with a stationary service-provider center. For example, the communications and/or information service can provide for the automatic and/or customer-initiated transmission of maintenance-related data from the motor vehicle to the service-provider center and a possible subsequent scheduling of servicing over the phone.

In this embodiment of the invention also, there is no need to provide any communication link specifically for purposes of the invention. Even if the mobile telephone is suitable, only to a limited extent, for connection to the motor vehicle device, it can be used in many cases at least for providing the necessary communication link for transmitting the characteristic vehicle data and characteristic telephone data.

According to a first variant of the second embodiment of the invention, the service-provider center is then connected or connectable to the service center within the meaning of the present invention. This is easily possible by way of a standard Internet connection, for example.

Alternately, according to a second variant of the second embodiment of the invention, the service-provider center can simultaneously function as a service center within the meaning of the present invention. The implementation of the invention then requires very low communication expenditure.

Preferably, the result of the evaluation regarding the suitability of the mobile telephone for connection to the motor vehicle device is then indicated to the vehicle user. A possibly non-existing suitability or limited suitability of the mobile telephone can thus be indicated to the vehicle user. In many cases, it is possible to urge the vehicle user by such a dedicated indication to eliminate the incompatibility. The absence of such a dedicated indication involves the risk of the vehicle user not recognizing a limited function range and/or malfunction at all (or accepting the same as being inherent to the functioning principle of the mobile telephone). By way of the dedicated indication, the vehicle user can be urged to eliminate the incompatibility, for example, by purchasing and using a fully compatible mobile telephone.

The result of the evaluation can be indicated in various ways. To begin with, an employee of the service center can call up the vehicle user over the mobile telephone and inform him about the result of the evaluation. This can also be carried out within the scope of a scheduled routine servicing.

A corresponding suitability message can also be transmitted using purely technical means. Preferably, a suitability message is transmitted to the mobile telephone or the motor vehicle device for indicating the result of the evaluation regarding the suitability of the mobile telephone for connection to the motor vehicle device.

In order to be able to transmit such a suitability message, which relates to the suitability of the mobile telephone for connection to the motor vehicle device, to the mobile telephone, a device can be optionally provided for transmitting the suitability message from the service center to the mobile telephone.

In the simplest case, for this purpose, the communication link, which is also used for transmitting the characteristic vehicle data and the characteristic telephone data to the service center, is formed such that it is bi-directional in order to also enable transmission of messages in the reverse direction from the service center to the mobile telephone. The suitability message can be transmitted from the motor vehicle device to the mobile telephone, unless the mobile telephone itself serves as the modem.

The suitability message transmitted to the mobile telephone can be output, for example, on a display of the mobile telephone or it can prompt the output of a corresponding indication on this display.

Alternately or additionally, a device for transmitting the suitability message from the service center to the motor vehicle device can be provided. In this case also, it is extremely simple to form the communication link, which is also used for transmitting the characteristic vehicle data and the characteristic telephone data to the service center, such that it is bi-directional in order to also enable transmission of messages in the reverse direction from the service center to the motor vehicle device. The suitability message can be transmitted from the mobile telephone to the motor vehicle device, if the mobile telephone itself serves as the modem.

The suitability message transmitted to the motor vehicle device can be output, for example, on a display in the vehicle interior or it can prompt the output of a corresponding indication on this display.

Preferably, the suitability message is output by the service center automatically in response to the transmission of the characteristic vehicle data and the characteristic telephone data. The result is then immediately available upon request.

As assistance in eliminating non-existing or limited suitability of the mobile telephone, the vehicle user can also be provided with information on suitable, fully compatible models, for example, together with the suitability message or following the same.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic diagram illustrating the communication flow in an exemplary embodiment of the invention.

DETAILED DESCRIPTION OF THE DRAWING

FIG. 1 shows the communication flow in an exemplary embodiment of the invention. A mobile telephone 2 is connected to a hands-free set 20 permanently installed in a motor vehicle 1. The mobile telephone 2 and the hands-free set 20 communicate bi-directionally via a Bluetooth connection 6; however, the range of functions of the system including the mobile telephone 2 and hands-free set 20 is limited since the mobile telephone is not fully compatible with the hands-free set 20. For example, the telephone directory of the mobile telephone 2 cannot be used.

When establishing the Bluetooth connection 6, a process for checking the suitability of the mobile telephone 2 for connection to the hands-free set 20 is started automatically. In the present case, the process is based on the use of a bi-directional communication link 8, which exists anyway between a telematics unit 3 of the motor vehicle and a service-provider center 4 for telematic services, independently of the hands-free set 20.

For purposes of the checking procedure, the telematics unit 3 and the service-provider center 4 are modified suitably and the hands-free set 20 is connected to the telematics unit 3.

Initially, characteristic vehicle data describing the hands-free set 20 are determined in the motor vehicle. In the present case, the hands-free set 20 itself reads these characteristic vehicle data from the memory area of the hands-free set 20 and transmits the same to the telematics unit 3 (arrow 7b).

Furthermore, characteristic telephone data describing the mobile telephone 2 are acquired. The hands-free set 20 requests these characteristic telephone data from the mobile telephone 2 after its connection, receives said data (arrow 7a) and transmits them to the telematics unit 3 (arrow 7c).

The message illustrated by the arrow 7a is transmitted via the physical communication link 6; however, this message is illustrated as a logical message by a separate arrow independent of the communication link 6 for the sake of clarity. The same applies to the communication link 8 and the messages 9 and 10.

An evaluation device for evaluating the suitability of a mobile telephone described by characteristic telephone data for connection to a motor vehicle device described by characteristic vehicle data are made available in the service-provider center 4 so that the latter can serve as a stationary service center within the meaning of the present invention. For this purpose, the service-provider center 4 maintains a look-up table in which the suitability of the mobile telephone can be determined based on the characteristic telephone data and the characteristic vehicle data received. The look-up table is updated regularly, particularly when a new software version for hands-free sets in motor vehicles—considered as users of the service center—is available on the market.

The characteristic vehicle data and the characteristic telephone data are transmitted (arrow 9) to the service-provider center 4 via the communication link 8. When the data are received, the suitability of the mobile telephone 2 for connection to the hands-free set 20 is evaluated automatically with the aid of the look-up table and a reply relating to the result of the evaluation is returned to the vehicle or the telematics unit 3 (arrow 10) via the communication link 8.

For indicating the result of the evaluation, the telematics unit 3 in the present case transmits the result directly to a display unit 5, which is disposed in the vehicle interior (arrow 11) and which indicates the result to the vehicle user. Likewise, the result could also be sent initially to the hands-free set 20 and transmitted by the same to a display unit for visualization. Lastly, the result could also be transmitted by the hands-free set 20 to the mobile telephone 2 and displayed by the latter.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for checking suitability of a mobile telephone for connection to at least one motor vehicle device of a motor vehicle, the method comprising the acts of:
   determining, by the motor vehicle, characteristic vehicle data describing the motor vehicle device;
   acquiring, by the motor vehicle device in the motor vehicle, characteristic telephone data describing the mobile telephone;
   transmitting, by the motor vehicle device in the motor vehicle, the characteristic vehicle data and the characteristic telephone data to a remote service center via a wireless communication link coupling the motor vehicle and the service center, said communication link being established independently of the mobile telephone; and
   receiving, by the motor vehicle device in the motor vehicle, via the wireless communication link from the remote service center, an indication of the suitability of the mobile phone for connection to the motor vehicle device of the motor vehicle.

2. The method according to claim 1, wherein the characteristic vehicle data relate to the motor vehicle and wherein characteristic device data relating to the motor vehicle device are acquirable from the characteristic vehicle data in the service center.

3. The method according to claim 1, wherein the indication of the suitability of the mobile telephone for connection to the motor vehicle device of the motor vehicle is received by the mobile telephone from the service center.

4. The method according to claim 1, wherein the indication of the suitability of the mobile telephone for connection to the motor vehicle device of the motor vehicle is received by the motor vehicle device from the service center.

5. The method according to claim 3, wherein the act of receiving the indication of the suitability of the mobile telephone for connection to the motor vehicle device occurs automatically in response to the transmitting of the characteristic vehicle data and the characteristic telephone data.

6. The method according to claim 4, wherein the act of receiving the indication of the suitability of the mobile telephone for connection to the motor vehicle device occurs automatically in response to the transmitting of the characteristic vehicle data and the characteristic telephone data.

7. A method for checking suitability of a mobile telephone for connection to at least one motor vehicle device of a motor vehicle, the method comprising the acts of:
   receiving, by a stationary service center comprised of one or more computer units that are remote from the motor vehicle, characteristic vehicle data describing the motor vehicle device, said characteristic vehicle data having been determined in the motor vehicle;
   receiving, by the stationary service center, characteristic telephone data describing the mobile telephone, the characteristic telephone data having been acquired by way of the motor vehicle device;
   evaluating, by the stationary service center, the suitability of the mobile telephone described by the characteristic telephone data for connection to the motor vehicle device described by the characteristic vehicle data in the stationary service center; and
   wherein the receipt of the characteristic vehicle data and the characteristic telephone data occurs via a wireless communication link between the motor vehicle and the service center established independently of the mobile telephone.

8. The method according to claim 7, wherein the characteristic vehicle data relate to the motor vehicle and wherein characteristic device data relating to the motor vehicle device are acquired from the characteristic vehicle data in the service center.

9. The method according to claim 7, further comprising the act of transmitting from the service center a suitability message, relating to the suitability of the mobile telephone for connection to the motor vehicle device, to the mobile telephone.

10. The method according to claim 7, further comprising the act of transmitting from the service center a suitability message, relating to the suitability of the mobile telephone for connection to the motor vehicle device, to the motor vehicle device.

11. The method according to claim 9, wherein the transmitting of the suitability message occurs automatically by the service center in response to the receipt of the characteristic vehicle data and the characteristic telephone data.

12. The method according to claim 10, wherein the transmitting of the suitability message occurs automatically by the service center in response to the receipt of the characteristic vehicle data and the characteristic telephone data.

* * * * *